3,553,081
PROCESS OF MICROBIOLOGICAL OXIDATION
Charles T. Goodhue and James R. Schaeffer, Rochester, N.Y., assignors to Eastman Kodak Company, Rochester, N.Y., a corporation of New Jersey
No Drawing. Filed May 8, 1968, Ser. No. 727,726
Int. Cl. C12d 1/02
U.S. Cl. 195—30                                   9 Claims

ABSTRACT OF THE DISCLOSURE

L(+)-beta-hydroxyalkanoic acids can be obtained by subjecting alkanoic acids to the oxidizing activity of one or more of the microorganisms *Pseudomonas putida, Pseudomonas fluorescens, Arthrobacter oxydans,* and *Arthrobacter crystallopietes.*

---

This invention relates to a process for the synthesis of beta-hydroxyl derivatives of alkanoic acids such as L(+) - beta - hydroxyisobutyric acid by microbiological oxidation.

These beta-hydroxyl derivatives of said acids and more particularly L(+)-beta-hydroxyisobutyric acids are valuable compounds whose bifunctional groups make them useful as starting materials for condensation polymerization to stereoregular polyesters and other synthetic polymers. Said acids are easily esterified by conventional means. These esters in turn can be directly converted to their polymethacrylates, for example, without previous isolation and dehydration of the methacrylic acid ester and polymerization of the ester. For example, the hydroxy-isobutyric acid is a source for the very valuable monomer alpha-methacrylic acid, the latter being easily obtained as stated above. Unfortunately, the quantity of L(+)-beta-hydroxyisobutyric acid is quite limited because chemical methods for preparation of the hydroxyisobutyric acid have failed to provide the product in satisfactorily high yields.

It has now been found that excellent yields of an L(+)-beta-hydroxyalkanoic acid can be obtained by oxidizing an alkanoic acid containing 4 to 6 carbon atoms and at least one hydrogen on the beta-carbon atom with a microorganism selected from the group consisting of *Pseudomonas putida, Pseudomonas fluorescens, Arthrobacter oxydans, Arthrobacter crystallopietes* and *Mycobacterium.* Alkanoic acids of this type are well known and include, for example, branched or straight chain saturated aliphatic monocarboxylic acids containing 4 to 6 carbon atoms and at least one hydrogen on the beta-carbon atom. These acids are exemplified by isobutyric, isovaleric, isocaproic acids and the like. Cultures of the L(+)-beta-hydroxyisobutyric acid-forming microorganisms employed are either available at several public culture collections such as the American Type Culture Collection (ATCC) in Washington, D.C., or can be easily isolated from natural materials such as soil by standard procedures known to microbiologists.

Illustrative of one such suitable method for isolation of a microorganism from soil is the following method used to obtain a new strain of *Pseudomonas putida,* a culture of which has been deposited with the ATCC under the accession number 21,244. Cultures of this organism are freely available to the public generally without restriction. A culture medium is prepared containing 2.0 g. isobutyric acid, 1.0 g. $(NH_4)_2SO_4$, 1.0 g. $K_2HPO_4$, 0.2 g. $MgSO_4 \cdot 7H_2O$, 0.05 g. $FeSO_4 \cdot 7H_2O$, 0.02 g. $CaCl_2$, 0.001 g. $MnSO_4 \cdot 7H_2O$, 0.0005 g. $NaMoO_4 \cdot 2H_2O$ in 1 liter of distilled water. The pH value of the medium is adjusted to 7.0 with KOH. A layer of soil 1.5 inches thick is mixed with 250 ml. of this medium and incubated 9 days in a 500 ml. Erlenmeyer flask at 30° without shaking. Within this time the supernatant culture medium becomes very cloudy. One milliliter of this culture is transferred to 25 ml. of sterile medium in a 125 ml. Morton flask (Bellco Glass) incubated at 30° with shaking at 400 r.p.m. on a rotary shaker (New Brunswick, Model G–10) for 3 days. The transfer and incubation are repeated twice more. The mixed culture thus obtained is plated onto a medium of the above composition solidified with 2 percent agar. Five different cultures (designated IBA–1 to IBA–5) are separated and maintained separately on agar slants of yeast extract and glucose (1 percent each).

The following is a summary obtained with a strain from the culture designated IBA–1 in standard tests for the characterization of bacteria (Society of American Microbiologists, 1957; Skerman, 1967; and Breed et al., 1957).

(1) Staining characteristics after growth for 18 hours on glucose-yeast extract medium:
    (a) Gram-negative
    (b) Non-acidfast
(2) Cell morphology after growth on glucose-yeast extract medium for periods up to 7 days:
    (a) Asporogenous
    (b) Motile by means of 1–3 polar flagella
    (c) Rods, $0.75–0.85\mu$ x $1.0–1.25\mu$, most often in pairs or short chains (sometimes 8–12 inches a single chain)
    (d) Not encapsulated
(3) Agar colonies (glucose-yeast extract medium):
    (a) Age: 72 hours
    (b) Form: circular; mature colonies become umbonate
    (c) Elevation: convex
    (d) Surface: smooth
    (e) Margin: entire
    (f) Chromogenesis: dull grayish-yellow
(4) Agar stroke (glucose-yeast extract medium):
    (a) Age: 72 hours
    (b) Form of growth: filiform
    (c) Consistency: butyrous
    (d) Chromogenesis: dull grayish-yellow
(5) Nutrient broth:
    (a) Age: 14 days
    (b) Surface growth: none
    (c) Clouding: strong
    (d) Sediment: compact
    (e) Amount of sediment: scanty
(6) Gelatin stab (glucose-yeast extract+5 percent gelatin):
    (a) Age: 14 days
    (b) Liquification: none
    (c) Growth: abundant surface growth
(7) Potato dextrose agar:
    (a) Age: 14 days
    (b) Growth: slight
    (c) Chromogenesis: grayish-yellow
(8) Hugh-Leifson carbohydrate medium:
    (a) Age: 14 days
    (b) Strictly aerobic
    (c) Glucose: acid; no gas
    (d) Lactose: alkaline; no gas
    (e) Sucrose: alkaline; no gas
    (f) Glycerol: acid; no gas
    (g) Mannitol: alkaline; no gas
(9) Action on milk:
    (a) Age: 14 days
    (b) Litmus: alkaline; no coagulation
    (c) Ulrich: alkaline with reduction
(10) Loeffler blood serum:
    (a) Age: 14 days
    (b) Growth: none

(11) SIM medium:
 (a) Age: 14 days
 (b) Motility: observed in 24 hours
 (c) $H_2S$: none
 (d) Indole: none
(12) Kligler iron agar:
 (a) Age: 14 days
 (b) $H_2S$: none
 (c) Dextrose and lactose not fermented
(13) Alkaline egg medium:
 (a) Age: 14 days
 (b) No proteolytic activity
(14) Additional special tests:
 (a) No growth in 10 percent ethanol-1 percent yeast extract within 14 days; poor growth in 4 days in 5 percent ethanol-1 percent yeast extract, pH, 6.5
 (b) No growth in uric acid medium within 14 days
 (c) Starch not hydrolyzed
 (d) Methyl red negative
 (e) Nitrite not produced from nitrate
 (f) Voges—Proskauer negative
 (g) Cellulose not hydrolyzed in 14 days
 (h) Good growth in citrate medium
(15) Temperature relations:
 (a) Age: 72 hours
 (b) 4° C.: no growth (in 10 days)
 (c) 25° C.: good growth
 (d) 30° C.: abundant growth
 (e) 31° C.: no growth
(16) Additional carbon sources:
 Isobutyric acid, L(+)-beta-hydroxyisobutyric acid, methylmalonic acid, alpha-methacrylic acid, succinic acid, propionic acid, acetic acid, isovaleric acid, 2-methyl-n-butyric acid, 2-methyl-n-valeric acid Based on these tests the culture is assigned to the genus Pseudomonas. Further tests required for characterization of the species and biotype [R. Y. Stanier, N. J. Palleroni and M. Doudoroff, Journal of General Microbiology, 43, 159 (1966)] are as follows.

(1) Pigmentation:
 (a) Fluorescent on King B
 (b) No phenazine on King A
(2) Cannot utilize the following compounds as sole source of carbon: trehalose, isositol, mannitol, maleate, adipate, acetamide, glycine, D-galactose, L-tryptophan, D,L-kyneurine
(3) Utilizes the following compounds as sole source of carbon: Nictotinate, hippurate, alpha-aminovalerate On the base of the above results we assigned our Pseudomonas culture to the species putida, Biotype A [R. Y. Stanier, N. J. Palleroni, and M. Doudoroff, Journal of General Microbiology, 43, 159 (1966)].

In accordance with the process of the invention isobutyric acid is subjected to the oxidizing activity of a microorganism selected from the aforementioned group, cultivated under aerobic conditions in a media favorable to development of the microorganism. During growth of the organism, isobutyric acid is oxidized in a stepwise manner through a series of intermediates, one of which is found to be L(+)-beta-hydroxyisobutyric acid. This particular acid accumulates in the fermentation medium grown under controlled conditions.

Although solid media can be utilized for cultivation of the microorganisms, it is preferred that an aqueous nutrient medium be employed. The aqueous nutrient medium should contain suitable sources of available carbon, nitrogen and minerals for proper growth of the microorganism. Isobutyric acid can serve as the sole carbon source if desired. Other sources of available carbon include corn meal, proteins, amino acids, carbohydrates, starches, dextrin, molasses and sugars such as glucose, fructose, mannose, maltose, sucrose, etc., while glycerol, alcohols, acetic acid, etc., are illustrative of materials which provide assimilable carbon. Nitrogen can be provided in assimilable form from such sources as soluble or insoluble animal and vegetable proteins, soybean meal, casein, peptones, polypeptides or amino acids, urea, ammonium salts such as ammonium sulfate, corn steep liquor and the like. Among the mineral constituents which the media can contain are calcium, magnesium, potassium and sodium as well as trace amounts of chromium, cobalt, copper, iron and zinc; sulfur can be provided by means of sulfates, cysteine, methionine, etc., while phosphorus can be provided from such sources as ortho-, meta- or pyro-phosphates, salts or esters thereof, glycerophosphate or corn steep liquor. Most advantageously a promoter such as a yeast extract is additionally included in the aqueous nutrient medium.

The culturing of the microorganisms employed in the invention is generally conducted at a temperature of about 25° to 30° C. under aerobic conditions. At temperatures much above 30° C., the yields are reduced while temperatures below about 25° C. slow down the growth rate. The pH of the medium is usually maintained at about 7.0 to 9.5. Ordinarily, the pH of the medium at the start is between about 7.0 and 8.0 and during the fermentation tends to rise to values as high as 9.5. Better and more consistent yields of product are obtained, however, when the pH is maintained at values of about 8.0 to 8.5 after the natural rise to pH 8.5 occurs. The aeration can be effected by either surface culture aerobic fermentation conditions or, and preferably, by submerged aerobic conditions. In general, about 24 to 50 hours are required to obtain the best yields.

The alkanoic acid, e.g., isobutyric acid, can be added to the nutrient medium when the medium is seeded with a culture of the desired microorganism in the growth state or after substantial growth of the selected organism has occurred in the nutrient medium under aerobic conditions. Another method comprises growing the microorganism on a nutrient medium (preferably but not necessarily containing isobutyric acid as the carbon source) until the microorganism reaches a stationary growth phase. The non-growing cells (also commonly referred to as "resting cells") are then removed from the nutrient medium as by centrifugation. These "resting cells" can then produce L(+)-beta-hydroxyisobutyric acid when resuspended in an aqueous suspension of isobutyric acid (preferably neutralized with KOH) under aerobic conditions. In this "resting cell" fermentation method it is beneficial to reduce that amount of aeration for instance by approximately one-third of that used in growing cell fermentations and to add small amounts of carbonate ion and glucose. These substances reduce the rate at which L(+)-beta-hydroxyisobutyric acid product is destroyed.

As a preferred embodiment, the process of the invention is conducted by running the last part of the fermentation as a "resting cell" or "resting state" fermentation. According to this procedure the growing cell fermentation is run until the culture reaches maximum growth and enters the stationary growth phase at which time the conditions are changed mainly by a reduction of aeration to effect a "resting cell" fermentation. This procedure more specifically described in the examples below has been found to provide an increase in the overall yield of the desired product and a significant reduction in the final amount of alkanoic acid starting material present.

The alkanoic acid concentration in the process of the invention can vary from about 1 to 150 grams per liter of culture medium depending upon the particular microorganism employed and whether a growing cell fermentation or a resting cell fermentation is utilized. With the microorganism Pseudomanas putida (ATCC No. 21,244), for instance, isobutyric acid concentrations above 20 grams per liter are inhibitory in growing cultures of this bacterium while in resting cells of this same bacterium concentrations of above 10 grams per liter are inhibitory. Higher concentrations of alkanoic acid are usually employable with the other hydroxyisobutyric-acid producing microorganisms of the invention.

After completion of the microbiological oxidation, the product can be recovered from the mixture by various means such as by ion exchange or extraction with a water-immiscible solvent, preferably ether, after acidifying the mixture. The extract containing the hydroxyisobutyric acid and unreacted alkanoic acid is then concentrated in vacuo either to a small volume or to dryness so as to obtain a liquid material. Purification of this material to isolate L(+)-beta-hydroxyisobutyric acid can be accomplished by distillation. Distillation of the extract to obtain the product as a free acid, however, is accomplished by considerable decomposition of the product. Furthermore, a product stability problem exists. On standing, the free acid slowly condenses and also readily undergoes an acid-catalyzed dehydration. It is advisable, therefore, to isolate the product in the form of a more stable derivative such as a salt or an ester. According to this procedure the hydroxyisobutyric acid in the extract is first converted to the salt or ester and recovered by conventional procedures. Esters of the hydroxyisobutyric acid can be prepared from an alcohol, preferably a lower alkanol using a suitable esterification catalyst such as borontrifluoride ethyl ether. Stable salts of the hydroxyisobutyric acid include alkali metal (e.g., lithium and potassium), alkaline earth metal (e.g., calcium and barium) and nickel salts.

The following examples are included to further illustrate the present invention.

EXAMPLE 1

A series of fermentations are carried out in 125 ml. Morton flasks containing 25 ml. of a sterilized aqueous nutrient medium having the following composition:

TABLE I.—ISOBUTYRIC ACID CULTURE MEDIA

| | G./liter of water |
|---|---|
| $(NH_4)_2SO_4$ | 2.0 |
| Yeast extract (Difco) | 0.2 |
| $MgSO_3 \cdot 7H_2O$ | 0.25 |
| $FeSO_4 \cdot 7H_2O$ | 0.029 |
| $MnSO_4 \cdot 7H_2O$ | 0.017 |
| NaCl | 0.006 |
| $ZnSO_4 \cdot 7H_2O$ | 0.0006 |
| $CaCl_2 \cdot 2H_2O$ | 0.0001 |
| Isobutyric acid | 0.5–150 |
| Water, to 1 liter. | |

The pH of the nutrient medium is adjusted to 7.0 with KOH and 125 ml. samples of the medium are inoculated with one of the microorganisms identified in Table II below. The isobutyric acid concentration (dried) of the medium is varied from 0.5 to 15%. Inocula for cultures in higher isobutyric acid substrate are obtained from cultures in the next lower concentration. Each fermentation is carried out at 25–30° C. The culture medium is constantly stirred and air is bubbled through the stirred medium. The pH value of the cultures during the fermentations rises to 8.5 and are thereafter maintained between 8.0–8.5.

During the fermentation period samples of the fermentation broth are centrifuged to remove the bacterial cells and other residuals and the residue analyzed for L(+)-beta-hydroxyisobutyric acid. The results are summarized in Table II.

TABLE II

| Organism | L(+)-beta-hydroxyisobutyric acid, g./liter | | | | | |
|---|---|---|---|---|---|---|
| | 0.5 [a] | 2 | 4 | 8 | 10 | 15 |
| Arthrobacter crystallopietes | 0.1 | [b] | | | | |
| Mycobacterium phlei | 0.2 | [b] | | | | |
| Mycobacterium sp | 0.4 | 0.7 | [b] | | | |
| Pseudomonas fluorescens | Trace | 0.7 | [b] | | | |
| Pseudomonas putida (ATTC No. 21,244) | 1.8 | 1.6 | [b] | | | |
| Arthrobacter oxydans (ATCC No. 14,358) | nil | 2.6 | 11.5 | 7.2 | 5.2 | 3.3 |

[a] Isobutyric acid substrate concentration in percent. Analysis of cultures containing 0.5 percent and 2 percent substrate is at 24 hours; 4 percent, 8 percent and 10 percent at 72 hours; 15 percent at 96 hours.
[b] Poor growth; no growth in next higher concentration.

The analytical procedure employed for determination of L(+)-beta-hydroxyisobutyric aicd recovered is based upon the gas chromatographic separation of the trimethylsily derivative of beta-hydroxyisobutyric acid and an internal standard (dodecane). The area under each component is measured and the ratio between the two calculated. A curve which plots L(+)-beta-hydroxyisobutyric acid concentration against the ratio of trimethylsilylated beta-hydroxyisobutyric acid peak area to internal standard peak area is employed to determine the L(+)-beta-hydroxyisobutyric acid concentration. Prior to trimethylsilylation, water is removed from a sample of the broth by freeze-drying the sample.

Similar results are obtained when isobutyric acid is replaced in the above procedure with the other alkanoic acids such as isovaleric acid or isocaproic acid to form the corresponding beta-hydroxy derivative.

The isobutyric acid concentration given in the following examples below is determined by a selective extraction of the acid with carbon disulfide and quantitative analysis of the isobutyric acid by infrared.

EXAMPLE 2

Production of L(+)-beta-hydroxyisobutyric acid by growing cultures

Several fermentation runs are conducted in a 15 liter stainless steel liter fermentor into which air is supplied by a single hole sparger mounted below a six-bladed paddlewheel stirrer. Another stirrer is mounted halfway up the stirring shaft.

11.5 liters of the medium described in Table I above containing 2% isobutyric acid is inoculated with 1 liter of a culture of *Pseudomonas putida* (ATCC No. 21,244) grown 48 hours in a similar nutrient medium. This 1-liter inoculum culture originally was inoculated with a 0.5% isobutyric acid medium culture that itself was inoculated directly from a nutrient medium slant. The 11.5-liter fermentations are performed at 26–28° C. with aeration at 0.26 VVM* and stirring at 600 r.p.m. Foaming is controlled by automatic addition of an antifoaming surface-active compound, Antifoam C (a trademark of Dow Corning, a corporation of Midland, Mich.). The results are reported in the following table:

TABLE III

| Time at maximum hours | Run | Isobutyric acid remaining, g. liter | L(+)-beta-hydro'yiso butyric acid, g. liter |
|---|---|---|---|
| 24 | 44 | 10.5 | 4.0 |
| 23 | 51 | 5.0 | 5.1 |
| 22 | 57 | 6.5 | 4.3 |
| 23 | 62 | 6.5 | 3.8 |
| 22 | 63 | 6.2 | 4.2 |
| 26 | 64 | | 3.2 |

*VVM=Volume of air/volume of fermentation broth/minute.

EXAMPLE 3

Production of L(+)-beta-hydroxyisobutyric acid by resting cells

Cells obtained by growing *Pseudomonas putida* (ATCC No. 21,244) in the 15-liter fermentor described in Example 2 are collected by centrifugation at 0–5° C. and then resuspended in a five-fold concentrated medium containing 1 percent isobutyric acid (neutralized with KOH and adjusted to pH 8.0–8.5 with $K_2CO_3$), 0.2 percent glucose, and 0.2 percent $K_2HPO_4$. The medium with resuspended cells is diluted to 10 liters and then aerated at 0.10 VVM with stirring at 300 r.p.m. and temperature at 28° C. Value of pH is controlled between 8.0 and 8.3 by automatic addition of 1 N HCl. The results obtained are as follows:

TABLE IV

| Run | Incubation time, hours | Isobutyric acid remaining, g./liter | L(+)-beta-hydroxyisobutyric acid, g./liter |
|---|---|---|---|
| 16 | 23 | 2.6 | 4.4 |
| 17 | 23 | 3.0 | 4.2 |
| 18 | 27 | 0.8 | 7.0 |
| 19 | 29 | 0.8 | 4.1 |

EXAMPLE 4

Production of L(+)-beta-hydroxyisobutyric acid by cultures in stationary growth phase Conditions for inoculation and growth are the same as described in Example 2. When maximum growth is achieved (usually after 22 hours), stirring is reduced to 300 r.p.m. and aeration is reduced to 0.10 VVM. When isobutyric acid concentration falls below 1 g./liter, the fermentation is stopped. The results are summarized in Table V below:

TABLE V

| Run | Time at harvest, hours | Isobutyric acid remaining, g./liter | L(+)-beta-hydroxyisobutyric acid, g./liter |
|---|---|---|---|
| 62 | 43 | 0.7 | 8.4 |
| 63 | 46 | 0.8 | 9.3 |
| 64 | 47 | 0.0 | 6.0 |

The invention has been described in detail with particular reference to certain preferred embodiments thereof, but it will be understood that variations and modifications can be effected within the spirit and scope of the invention as described hereinabove and as defined in the appended claims.

We claim:

1. A process for the preparation of an L(+)-beta-hydroxyalkanoic acid which comprises oxidizing an alkanoic acid containing 4 to 6 carbon atoms and at least one hydrogen on a beta-carbon atom with a microorganism selected from the group consisting of *Pseudomonas putida*, *Pseudomonas fluorescens*, *Arthrobacter crystallopietes*, and *Arthrobacter oxydans*.

2. The process of claim 1 in which said alkanoic acid is isobutyric acid.

3. The process of claim 2 in which said isobutyric acid is oxidized by the action of a growing microorganism.

4. The process of claim 1 in which said oxidizing of said alkanoic acid comprises fermentating a medium capable of supporting the growth state and resting state of said microorganisms.

5. The process of claim 1 wherein said microorganisms are cultivated in an aqueous nutrient medium under submerged aerobic conditions until maximum growth is obtained and isobtyric acid is then added to said medim.

6. The process of claim 1 wherein said microorganisms are cultivated in an aqueous nutrient medium under submerged aerobic conditions until maximum growth is obtained, separating the resulting microorganisms from said medium and adding them to an isobutyric acid-containing aqueous medium under aerobic conditions.

7. The process of claim 1 wherein said microorganism *Pseudomonas putida* is *Pseudomonas putida* (ATCC No. 21,244).

8. A process according to claim 1 in which said microorganism is cultivated in an aqueous nutrient medium under aerobic conditions in the presence of isobutyric acid at a pH of about 7.0 to about 9.5 and a temperature of about 25° to about 30° C. and recovering L(+)-beta-hydroxyisobutyric acid.

9. The process of claim 1 in which said prepared L(+)-beta-hydroxyalkanoic acid is recovered from the fermentation extract containing said acid by first converting said acid to its salt or ester and then recovering said L(+)-$\beta$-hydroxyalkanoic acid therefrom.

References Cited

IIDA Chemical Abstracts, vol. 47, No. 11341 (1953).

A. LOUIS MONACELL, Primary Examiner

G. M. NATH, Assistant Examiner